United States Patent [19]
Richter et al.

[11] Patent Number: 5,588,368
[45] Date of Patent: Dec. 31, 1996

[54] SECONDARY SUSPENSION FOR RAIL VEHICLES

[75] Inventors: Wolfgang-Dieter Richter, Winkelhaid; Lutz Uebel, Heroldsberg; Engelbert Weeger, Nürnberg, all of Germany

[73] Assignee: MAN GHH Schienenverkehrstechnik GmbH, Nurnberg, Germany

[21] Appl. No.: 211,367

[22] PCT Filed: Jul. 30, 1993

[86] PCT No.: PCT/DE93/00671

§ 371 Date: Mar. 30, 1994

§ 102(e) Date: Mar. 30, 1994

[87] PCT Pub. No.: WO94/03340

PCT Pub. Date: Feb. 17, 1994

[51] Int. Cl.⁶ ................................. B61F 5/00
[52] U.S. Cl. .................... 105/199.1; 105/158.2; 105/453
[58] Field of Search ............... 105/199.1, 199.2, 105/453, 158.2; 280/711, 703, 707; 180/294

[56] References Cited

U.S. PATENT DOCUMENTS

| | | |
|---|---|---|
| 2,917,321 | 12/1959 | Fennell . |
| 3,012,521 | 12/1961 | Lich ............................. 105/199.1 |
| 3,491,702 | 1/1970 | Dean ............................ 105/199.1 |
| 3,524,657 | 8/1970 | Yew et al. . |
| 3,580,557 | 5/1971 | Dean ............................ 105/199.1 |
| 4,097,063 | 6/1978 | Dean . |
| 4,113,111 | 9/1978 | Theurer et al. ............... 105/199.1 |
| 4,238,128 | 12/1980 | McKee ............................ 280/203 |
| 4,245,563 | 1/1981 | Empson ......................... 105/199.2 |
| 4,248,455 | 2/1981 | Manning ......................... 280/711 |
| 4,341,398 | 7/1982 | Condon et al. .................. 280/711 |
| 4,458,605 | 7/1984 | Herring et al. ................ 105/199.1 |
| 4,535,867 | 8/1985 | Botar ............................ 280/294 |

FOREIGN PATENT DOCUMENTS

| | | |
|---|---|---|
| 0453752 | 3/1991 | European Pat. Off. . |
| 1576829 | 6/1969 | France . |
| 7827263 | 9/1978 | France . |
| 2723305 | 5/1977 | Germany . |
| 373847 | 9/1981 | Germany . |

*Primary Examiner*—Mark T. Le
*Attorney, Agent, or Firm*—Peter Jon Gluck; Thomas R. Morrison; Christopher R. Pastel

[57] ABSTRACT

The body of a rail vehicle is lowered when it is stationary to facilitate ingress and egress. The body is raised in preparation for motion to provide satisfactory road clearance. In one embodiment of the invention, a lifting cylinder, in series with a supplementary spring, is extended during travel, and is contracted when the rail vehicle is stopped. In other embodiments, a hydraulic cylinder, either alongside, or coaxial with the supplementary spring, compresses the supplementary spring when the rail vehicle is stopped. In a further embodiment, the hydraulic cylinder is replaced with an electromechanical adjusting element such as a screw drive. A control system, preferably actuated by unlocking and locking of the door opening lock, actuates the lowering and raising of the body.

4 Claims, 5 Drawing Sheets

SECONDARY SUSPENSION FOR RAIL VEHICLES

BACKGROUND OF THE INVENTION

The invention relates to secondary suspensions for rail vehicles, and more particularly to a secondary suspension for a rail vehicle whose mounting position, or mounting height, can be altered by means of supplementary elements.

Low-level rail vehicles of conventional design have a free space located between the running gear and the car body. This free space is generally determined by two principal factors. First, a travel distance of secondary spring deflections must be considered. This factor is dynamic and depends on a load carried.

The second factor includes the geometrical boundary conditions resulting from travel on a summit, an incline, or upon a ramp. These latter conditions may be temporarily disregarded for a stationary vehicle.

The long standing problem of reducing the free space, between the running gear and the car body, may be addressed by supplementing the secondary suspension of a vehicle. The floor level, and thus the level of the boarding ledge, may be reduced by decreasing the height of this free space. Numerous attempts have been made to solve issues related to this problem in the devices of the prior art.

A car jacking device is disclosed in U.S. Pat. No. 2,917,321 which shows a static shock absorber. The simply constructed shock absorber includes a locking device to prevent movement of the chassis of the vehicle relative to a suspension system thereof. However, no mechanism to dynamically adjust for changing geometrical boundary conditions is disclosed.

U.S. Pat. No. 3,524,657 discloses a composite spring assembly for a vehicle. This composite spring assembly uses a constant rate spring in parallel with a vacuum actuated variable rate spring. Constraints related to the size of the vacuum spring assembly, however, necessitate a remote location of the coil spring.

U.S. Pat. No. 4,097,068 discloses a pneumatic-coil spring suspensions which has a pneumatic spring component located below a coil spring component to substantially inhibit tilting of the pneumatic spring component. This suspension, however, employs a fixed spring seat for the pneumatic spring component.

In order to selectively allow a car body to be lowered, (for example, at train stops) a device is required for variably shortening the suspension system of a rail vehicle without compromising the dynamic operation of the suspension system during travel. Thus, elements must be provided which function as a damper during travel, as well as functioning to shorten the secondary spring mechanism while stationary.

OBJECTS AND SUMMARY OF THE INVENTION

Accordingly, it is an object of the invention to provide a secondary suspension for a rail vehicle that overcomes the drawbacks of the prior art.

It is a further object of the invention to supplement the secondary suspension of a vehicle so that the floor level and thus the level of the boarding ledge is reduced by the height of the free space.

Briefly stated, the present invention provides a rail vehicle in which the body of the rail vehicle is lowered when it is stationary to facilitate ingress and egress. The body is raised in preparation for motion to provide satisfactory road clearance. In one embodiment of the invention, a lifting cylinder, in series with a supplementary spring, is extended during travel, and is contracted when the rail vehicle is stopped. In other embodiments, a hydraulic cylinder, either alongside, or coaxial with the supplementary spring, compresses the supplementary spring when the rail vehicle is stopped. In a further embodiment, the hydraulic cylinder is replaced with an electromechanical adjusting element such as a screw drive. A control system, preferably actuated by unlocking and locking of the door opening lock, actuates the lowering and raising of the body.

According to an embodiment of the invention, there is provided a secondary suspension for a rail vehicle, comprising: at least one spring between a car body and a bogey frame, means, responsive to a first condition of operation of the rail vehicle, for compressing the at least one spring, whereby a height of the car body is reduced, and lifting means, responsive to a second condition of operation of the rail vehicle, for permitting the at least one spring to become extended, whereby a suitable road clearance of the car body is maintained.

According to a feature of the invention, there is provided a secondary suspension for rail vehicles, comprising: a supplementary spring, means for fixing the supplementary spring means between a car body and a bogey frame of the rail vehicle, means for compressing the supplementary spring when the rail vehicle is stopped, thereby lowering the car body, and means for permitting extension of the supplementary spring when the rail vehicle is in motion.

According to a further feature of the invention, there is provided a secondary suspension for rail vehicles, comprising: a supplementary spring, means for compressing the supplementary spring to limit a range of motion of the supplementary spring, means for lifting connected in series with the supplementary spring, and means for locking the means for lifting in an upper end position.

According to a further feature of the invention, there is provided a secondary suspension for a rail vehicle, comprising: a secondary spring between a car frame and a car body of the rail vehicle, a lifting cylinder, means for permitting the lifting cylinder to raise the car body during travel of the rail vehicle, a mechanical latch, the mechanical latch including means for latching the lifting cylinder in its raised position, a locking cylinder, and the mechanical latch including means for permitting the locking cylinder to unlatch the mechanical latch.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1A:
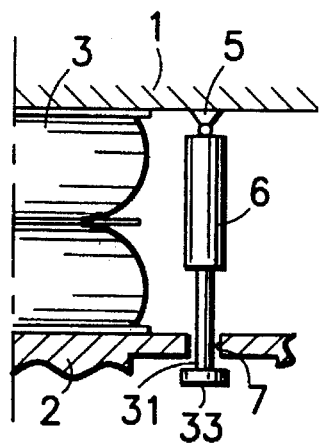
FIG. 1A is a side view, partially in cross section, of a secondary suspension for rail vehicles according to an embodiment of the present invention.

Referring to FIG. 1A, a secondary suspension for a rail vehicle includes a secondary elastomeric spring 3 between a car body 1 and a bogey frame 2. A cardanically movable linkage 5, or universal joint, connects one end of an electromechanical adjusting element 6 to car body 1. A shaft 31 of electromechanical adjusting element 6 extends through a guidance hole 7 in bogey frame 2. A head 33 on shaft 31 prevents shaft 31 from being withdrawn through guidance hole 7. Electromechanical adjusting element 6 may be of any convenient type such as, for example, a screw drive.

It will be clear to one skilled in the art that a conventional primary suspension is also present between car body 1 and bogey frame 2. However, since such a primary suspension is conventional, and does not constitute an inventive part of the present disclosure, illustration and description thereof is omitted.

During travel of the rail vehicle, elastomeric spring 3 responds to vertical accelerations. When the rail vehicle is stationary, shaft 31 is withdrawn into electromechanical adjusting element 6 as far as possible so that head 33 is moved into positive contact with the underside of bogey frame 2. In one embodiment of the invention, shaft 31 is drawn forcibly into electromechanical adjusting element 6 to compress elastomeric spring 3, thereby lowering the height of car body 1, as is desired. In another embodiment of the invention shaft 31 of electromechanical adjusting element 6 is free to dampen vertical vibration in the manner of a shock absorber.

Figure 1B:
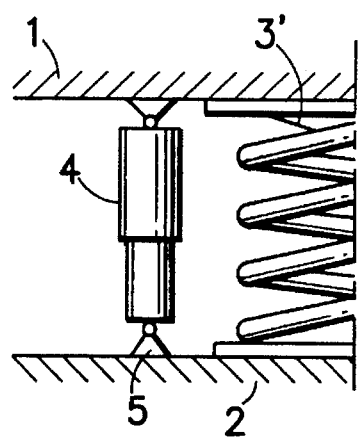
FIG. 1B is a side view, partially in cross section, of a secondary suspension for rail vehicles according to an embodiment of the present invention.

Referring now to FIG. 1B, a helical spring 3' is mounted between car body 1 and bogey frame 2. A hydraulic cylinder 4 is mounted alongside helical spring 3' on cardanically movable linkages 5. Operation of this embodiment is the same as the embodiment of FIG. 1A, with the exception that, if hydraulic cylinder is used for damping during travel, two-way damping is possible, rather than the one-way damping available in the embodiment of FIG. 1.

Figure 2:
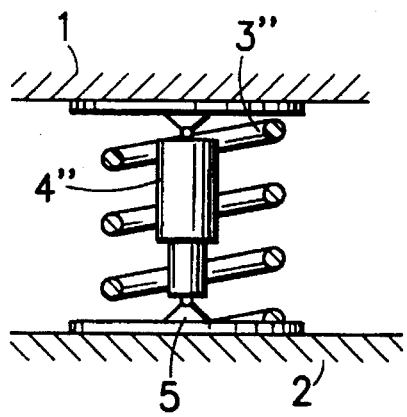
FIG. 2 is a side view, partially in cross section, of a secondary suspension for rail vehicles according to an embodiment of the present invention.

Referring to FIG. 2, a further embodiment of the invention is the same as the embodiment of FIG. 1B, except that a hydraulic cylinder 4" is disposed coaxially within a helical spring 3", between car body 1', and bogey frame According to the above embodiments of the present invention, passive secondary springs, such as steel helical springs or elastomeric springs are compressed by hydraulic or electromechanical elements to compress the springs beyond values that occur during travel, and thus allow the car body to be lowered at train stops.

The above embodiments may also use more than one hydraulic or electromechanical element with each spring, to permit parallel operation of the hydraulic or electromechanical elements. In such a case, the hydraulic or electromechanical elements are preferably disposed symmetrically to an axis of suspension. In a further embodiment of the invention, a single spring may have one or more electromechanical adjusting element 6, together with one or more hydraulic cylinders 4 to combine the advantages of the embodiment of FIG. 1A with the advantages of the embodiments of FIGS. 1B and 2.

During travel, hydraulic elements may act as dampers via an idle connection with an integrated throttle. However, electromechanical elements must provide sufficient dead travel to cover the operational cycles of the spring under load or under lateral displacements.

Alternatively or additionally, a lifting element can be added to the passive secondary springs, the retraction of which sufficiently reduces the operating position of the spring at a train stop. For this it is an advantage if the lifting element is provided with a locking arrangement for the upper end position. This can be done, for example, by a locking arrangement that is activated by at least one latch mounted on the bogey frame engaging in a slot in the lifting cylinder.

To achieve the lowest possible mounting height of the system, several lifting elements are arranged beside each other in a common housing. With appropriate dimensioning, a limited redundancy can be achieved if hydraulic elements can be individually separated via differential pressure valves.

Figure 3:
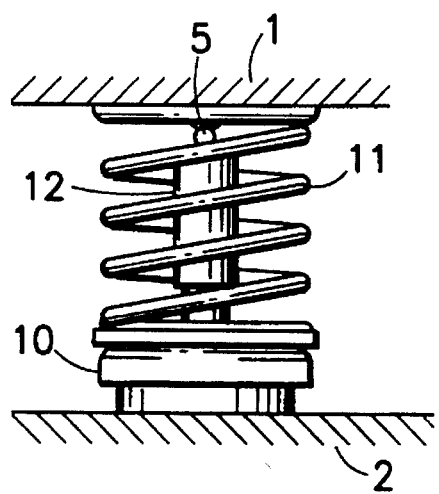
FIG. 3 is a side view, partially in cross section, of secondary suspension for rail vehicles according to an embodiment of the present invention.

Referring now to FIG. 3, a lifting cylinder 10 is mounted on bogey frame 2. A helical spring 11 is disposed between lifting cylinder 10 and car body 1. A hydraulic cylinder 12 is coaxially mounted inside helical spring 11, connected by cardanically movable linkages 5 to lifting cylinder 10 and car body 1.

In this embodiment, lifting cylinder 10 is extended during travel to provide clearance, and is contracted at stations to lower the sill of the car body for easy ingress and egress. Hydraulic cylinder 12 may be used as in prior embodiments for one or both of shock absorbing and compression of helical spring 11.

Figure 4:
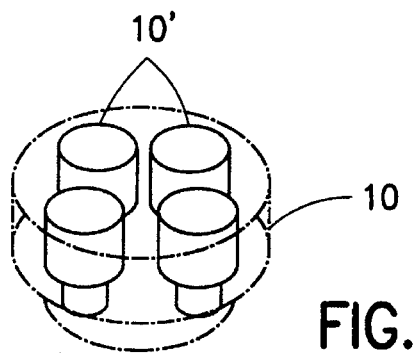
FIG. 4 is a perspective view of a portion of a secondary suspension for rail vehicles according to an embodiment of the present invention.

Referring to FIG. 4, one embodiment of lifting cylinder 10, of the embodiment of FIG. 3, includes a plurality of hydraulic cylinders 10' symmetrically disposed inside a housing. The use of more than one hydraulic cylinder 10' provides sufficient lifting capacity without requiring long travel that would be required with a single hydraulic cylinder. This results in minimizing the vertical height of lifting cylinder 10, and thereby minimizing the height of car body 1.

Figure 5:
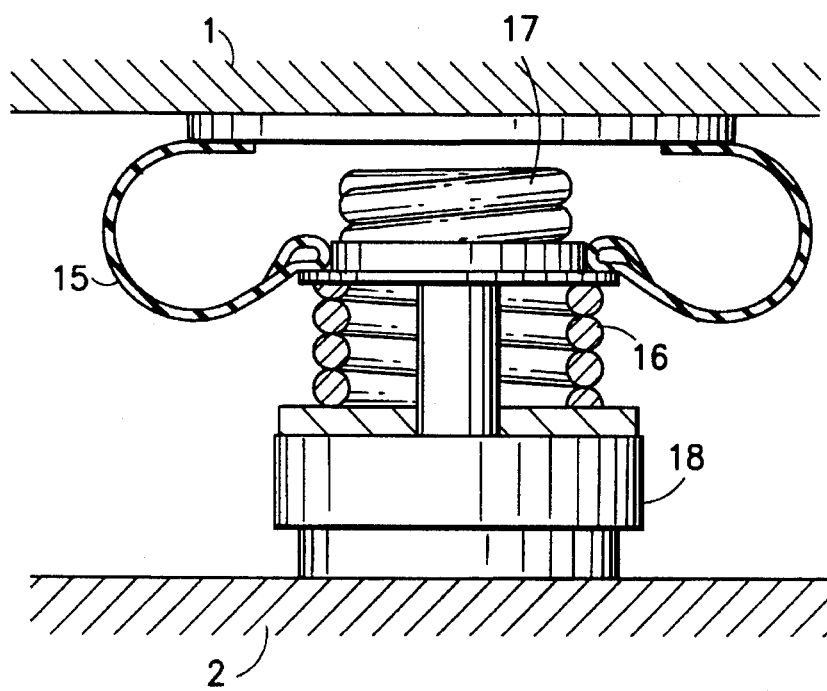
FIG. 5 is a schematic illustration of a design for secondary suspension for rail vehicles according to an embodiment of the present invention.

Referring now to FIG. 5, a further embodiment of the invention includes a lifting cylinder 18 mounted on bogey frame 2. A supplementary spring 16 is mounted atop lifting cylinder 18. An air bellows 15 is disposed between supplementary spring 16 and car body 1. An emergency spring 17 is connected to the upper end of supplementary spring 16 within air bellows 15. An upper end of emergency spring 17 is normally separated by a gap from the lower surface of car body 1.

As in prior embodiments, lifting cylinder 18 is extended during travel, and retracted while the rail vehicle is stopped. Air bellows 15 provides the secondary suspension in a manner similar to elastomeric spring 3 of FIG. 1A, and helical spring 3' or 3" of FIGS. 1B and 2, respectively. Due to the compliance of air bellows 15, supplementary spring 16 and emergency spring 17 absorb vertical motion when car body 1 comes into contact with the upper end of emergency spring 17.

Figure 6:
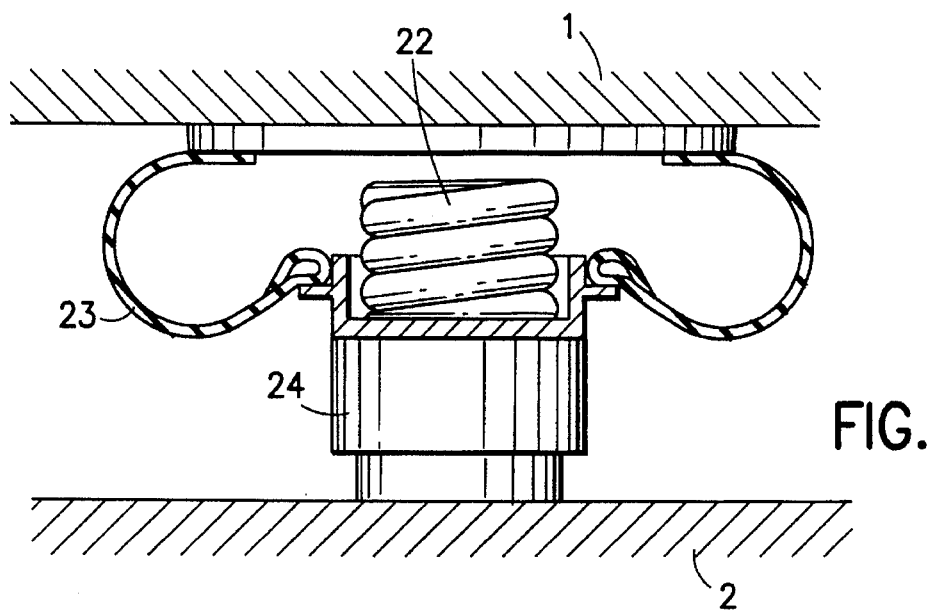
FIG. 6 is a side view, partially in cross section, of secondary suspension for rail vehicles according to an embodiment of the present invention.

Referring now to FIG. 6, a secondary suspension employs a lifting cylinder 24 and an air bellows 23 in a manner similar to that of the embodiment of FIG. 5. In this embodiment, however, supplementary spring 16 is omitted. The operation of this embodiment is the same as described above.

Figure 7:
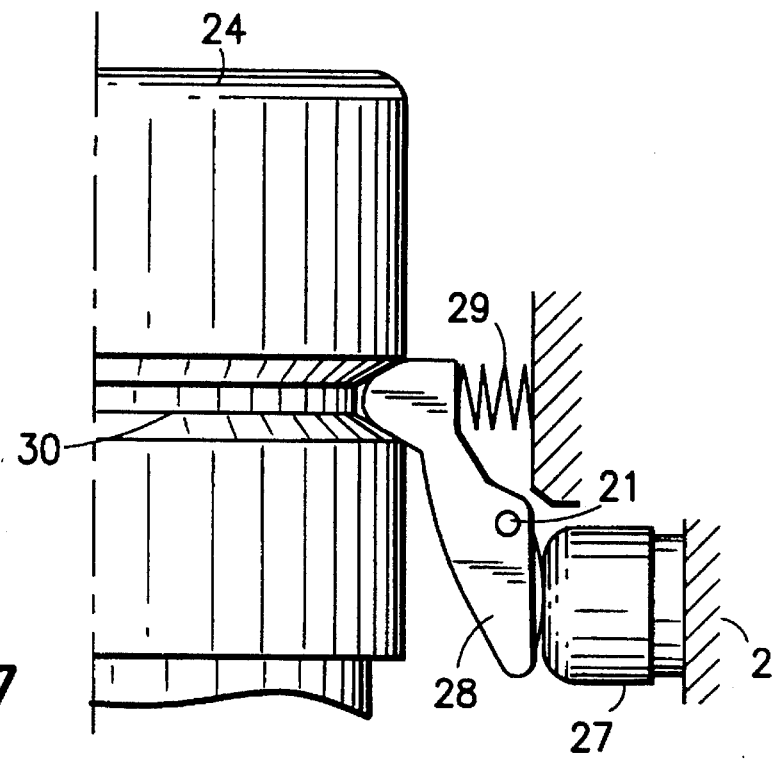
FIG. 7 is a side view of a lifting cylinder of the secondary suspension for rail vehicles according to an embodiment of the present invention, shown in the locked condition.

Referring now to FIG. 7, lifting cylinder 24 includes a slot 30 about its circumference. During travel, lifting cylinder 24 is extended as shown, and locked in position by engagement of a latch 28 in slot 30. Latch 28 is biased about a pivot 21 toward lifting cylinder 24 by a spring 29. A locking cylinder 27 is disposed between bogey frame 2 and latch 28. Locking cylinder 27 receives a pressurized fluid for unlocking purposes, as will be described. In the locked condition, latching is passive due to the resilient biasing provided by spring 29.

Figure 8:
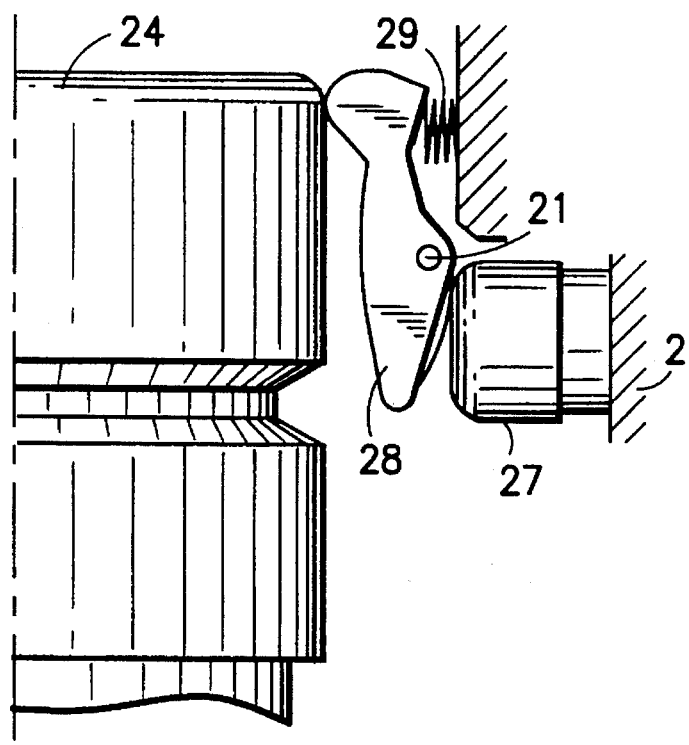
FIG. 8 is a side view of the lifting cylinder of FIG. 7 shown in the unlocked condition.

Referring now to FIG. 8, locking cylinder 27 is energized to rotate latch 28 clockwise about pivot 21 against the bias force of spring 29. This moves latch 28 out of engagement with slot 30. This permits lifting cylinder 24, which is resiliently coupled to car body 1 (not shown in FIG. 8), to be lowered, thereby lowering car body 1, as is desired. Once latch 28 is disengaged from slot 30, and lifting cylinder 24 is lowered, the unlocked condition is maintained whether or not locking cylinder 27 remains energized.

Figure 9:
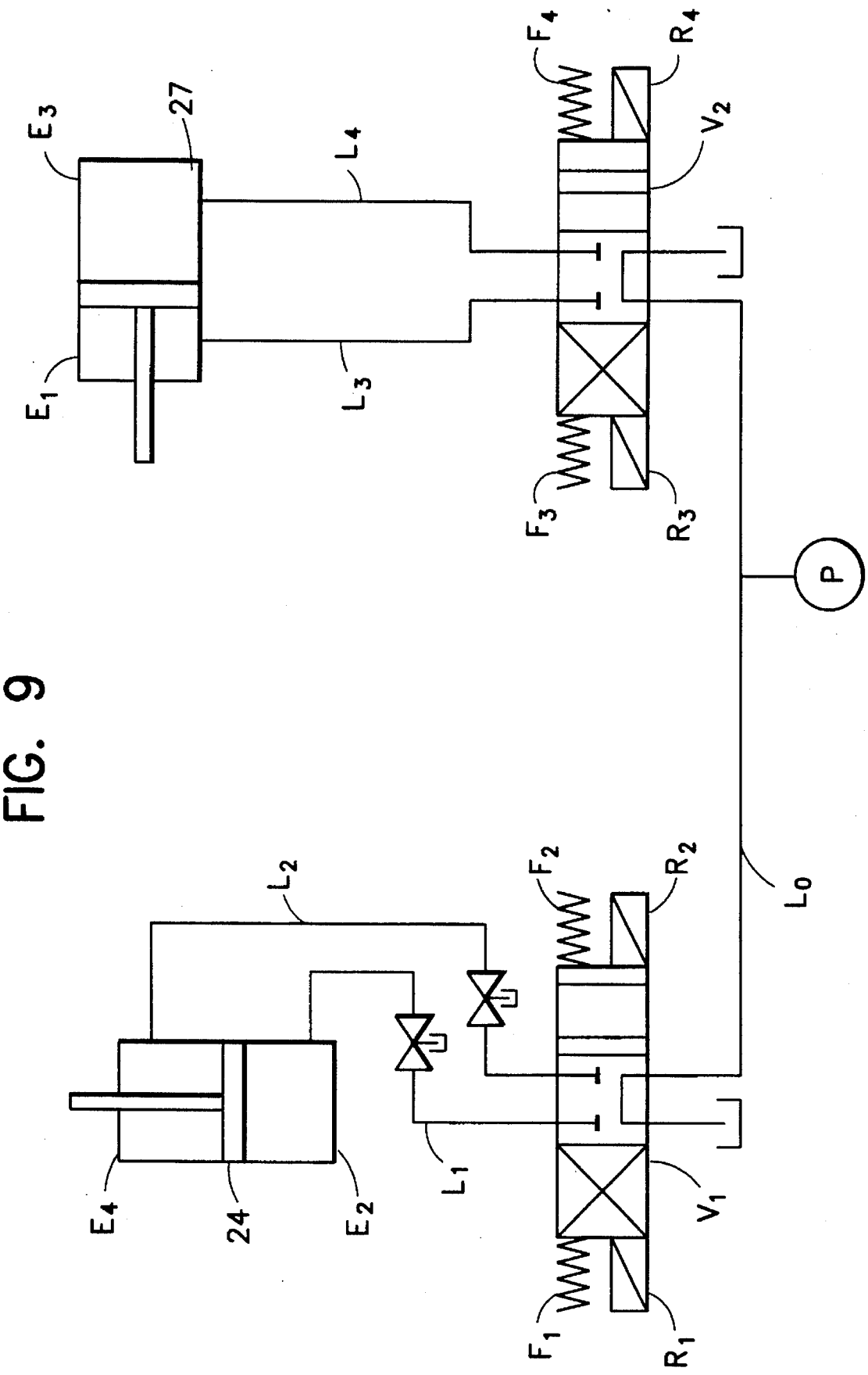
FIG. 9 illustrates a schematic view of the hydraulic system for the embodiment of the present invention shown in FIG. 7 and FIG. 8.
Figure 10:
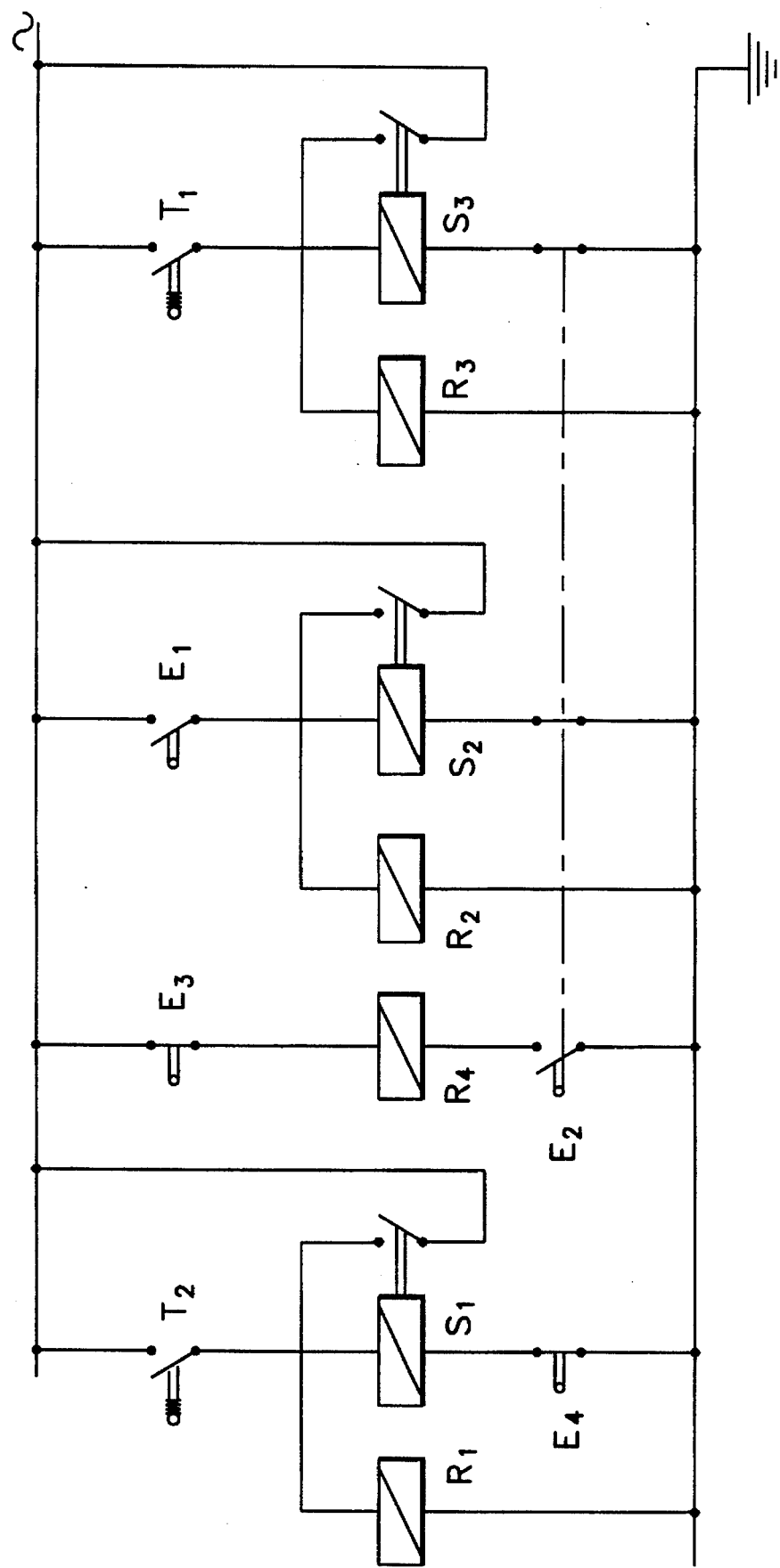
FIG. 10 illustrates an electrical diagram of the embodiment of the present invention shown in FIG. 7 and FIG. 8.

Referring now to FIGS. 9 and 10, a control system for lifting cylinder 24 (FIGS. 7 and 8) is actuated by sensors T1 and T2. In the preferred embodiment, sensor T1 is actuated when a door opening key is moved to the opening position. Sensor T2 is actuated when the door opening key is moved to the locking position. Other techniques for actuating sensors T1 and T2 may be employed without departing from the spirit and scope of the invention.

When the rail vehicle comes to a stop, the car body is lowered as follows:

Sensor $T_1$, detects that the car is stopped (by detecting actuation of the door opening key), and thereupon activates a servo relay $S_3$. Servo relay $S_3$ applies power to a coil of an operating relay $R_3$ of a hydraulic valve $V_2$. Hydraulic valve $V_2$ connects pressure delivery line $L_0$, and line $L_4$. A piston of a locking cylinder 27 is moved outward by the fluid pressure in line $L_4$ until the limit switch E1 is actuated. This opens the locking device to release lifting cylinder 24 (FIGS. 7 and 8) and thereby permit lowering of car body 1.

Activation of limit switch $E_1$ applies actuating power to servo relay $S_2$. The closed contacts of servo relay $S_2$ apply power to a coil of an operating relay $R_2$ of hydraulic valve $V_1$. Hydraulic valve $V_1$ connects pressure delivery line $L_0$ to line $L_2$. This pressure, applied to an upper portion of hydraulic cylinder 24, lowers lifting cylinder 24 until limit switch $E_2$ is actuated. Limit switch $E_2$ terminates the lowering process.

The operation of limit switch $E_2$ also removes actuating power from servo relays $S_3$, and $S_2$, and thus from operating relays $R_3$, and $R_2$. Springs $F_4$, and $F_1$, move hydraulic valves $V_2$, and $V_1$, into their neutral positions, in which they block lines $L_4$ and $L_2$. Thus the pistons of locking cylinder 27, and lifting cylinder 24, remain in the described end positions.

At the same time, the operating valve $R_4$, of hydraulic cylinder $V_2$, is activated through the limit switch $E_2$. This connects fluid pressure from pressure delivery line $L_0$ to line $L_3$. The fluid pressure in line $L_3$ returns the piston of locking cylinder 27 to its initial position in which it deactivates the operating relay $R_4$. Spring $F_3$ returns hydraulic valve $V_2$ to its neutral position. This blocks lines $L_3$, and $L_4$. The pistons of locking cylinder 27 and lifting cylinder 24 remain in the locking positions. This ensures that, in the event that the supply of pressurized fluid fails, lifting cylinder 24 can be released by hand operation of hydraulic valves $V_1$ and $V_2$ and external actuation of lifting cylinder 24 into the unlocked condition shown in FIG. 8, or the locked condition shown in FIG. 7.

The lifting process takes place as follows:

actuation of sensor $T_2$ energizes the coil of a servo relay $S_1$. A coil of an operating relay $R_1$ through the closed contacts of servo relay $S_1$. Servo relay $S_1$ connects pressure delivery line $L_0$ to $L_1$. Fluid pressure, applied to the lower portion of lifting cylinder 24, raises the piston of lifting cylinder 24. A limit switch $E_4$ is opened at the upper limit of travel of lifting cylinder 24. The opened contacts of limit switch $E_4$ remove power from servo relay $S_1$ and operating relay $R_1$. Hydraulic valve $V_1$ is returned to its neutral position by spring $F_2$. This blocks lines $L_1$, and $L_2$ and retains the piston of lifting cylinder 24 in its raised position.

Although only one latch 28 is shown in FIGS. 7 and 8, in the preferred embodiment, two latches 28, are disposed on opposite sides of lifting cylinder 24 to hold lifting cylinder 24 in the raised position.

During travel, hydraulic elements may act as a damper via an idle connection with an integrated throttle. Electromechanical elements include a range of dead travel that covers the operational cycles of the spring under load or under lateral displacements.

Alternatively or additionally, a lifting element can be added to the passive secondary springs, which sufficiently lowers the operating position of the spring at a train stop. For this it is an advantage if the lifting element is provided with a locking arrangement for the upper end position. This can be done, for example, by a locking arrangement that is activated by at least one latch mounted on the bogey frame to engage a slot in the lifting cylinder.

The lowest possible mounting height of the system may be achieved using several lifting elements in parallel with each other in a common housing. With appropriate dimensioning, limited redundancy can be achieved using differential pressure valves to individually control the hydraulic elements.

Advantageously, the lifting cylinder includes a mechanical locking arrangement whose final position corresponds to the raised position. This locking arrangement is coupled with the lifting system such that it can be disengaged for lowering only when the system is operational, to ensure the ability to return to the raised position. Independently of this, the locking mechanism locks even when the vehicle is brought externally to a level that corresponds to the raised position.

Advantageously, in the case of active secondary springs, the emergency spring element which is customary with air springs, can be designed as a hydropneumatic spring which also performs the desired function.

In the case of bolsterless air suspension bogies, the air bellows and supplementary spring usually absorb the lateral motions that occur during turns. When the air supply fails, the supplementary spring does this alone.

If a hydropneumatic lifting element functions at the same time as a hydropneumatic supplementary spring, the emergency spring characteristics required in lateral direction must be ensured by arranging a laterally flexible elastomeric laminar spring inside the air bellows.

In the case of bogies with a bolster, the entire secondary spring stage can be designed as a hydropneumatic spring with a variable operating point.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A secondary suspension for rail vehicles, comprising:

a supplementary spring;

means for fixing said supplementary spring means between a car body and a bogey frame of said rail vehicle;

means for fixing said supplementary spring means between a car body and a bogey frame of said rail vehicle;

means for compressing said supplementary spring when said rail vehicle is stopped, thereby lowering said car body;

means for permitting extension of said supplementary spring when said rail vehicle is in motion;

said means for permitting extension includes at least one lifting element;

said at least one lifting element includes means for locking said lifting element at an upper end position thereof;

said means for locking includes at least one latch;

said at least one latch engages a slot in said lifting element.

2. A secondary suspension for a rail vehicle, comprising:

a secondary spring between a car frame and a car body of said rail vehicle;

a lifting cylinder;

means for permitting said lifting cylinder to raise said car body during travel of said rail vehicle;

a mechanical latch;

said mechanical latch including means for latching said lifting cylinder in its raised position;

a locking cylinder; and said mechanical latch including means for permitting said locking cylinder to unlatch said mechanical latch.

3. Apparatus according to claim 2, further comprising:

first means for sensing a condition indicative of said rail vehicle being stationary;

means, responsive to said first means, for actuating said lifting cylinder to a lower position, and for actuating said locking cylinder to unlatch said lifting cylinder to permit motion thereof;

second means for sensing a condition indicative of said rail vehicle being ready for motion; and means, responsive to said second means, for actuating said lifting cylinder to a higher position.

4. Apparatus according to claim 3, wherein said first means includes a door opening sensor, and said second means includes a door closing sensor.

* * * * *